3,084,154
WATER-SOLUBLE METHYLHESPERIDINS AND
THEIR PRODUCTION
Ikuo Sakieki, Hikari, Yamaguchi, Japan, assignor to
Takeda Pharmaceutical Industries, Ltd., Osaka, Japan
No Drawing. Filed Aug. 26, 1958, Ser. No. 757,185
Claims priority, application Japan Aug. 27, 1957
14 Claims. (Cl. 260—210)

This invention relates to water-soluble methylhesperidins and a process for producing them.

In 1936, L. B. Armentano and Szent-Györgyi et al. succeeded in extracting citrin from lemon juice and designated it as vitamin P (Deutsch. Med. Woschr. 62, 1325 (1936)). Later it was clarified that the vitamin P effect of the substance is attributable to hesperidin which is the main principle thereof. Since the effect of rutin was reported by J. Q. Griffith et al. (Proc. Soc. Expt. Biol. Med., 55, 228 (1944)), there have been reported many investigations on substances having vitamin P-like effect or on bioflavonoids. C. W. Wilson has succeeded in obtaining methylated hesperidin chalcone through a path wherein hesperidin is first treated with concentrated alkali solution to produce its chalcone and the product is then methylated with dimethyl sulfate (U.S. Patents 2,425,291 and 2,615,015). The methylated hesperidin chalcone is stable in a wide pH range and its excellent medicinal effect was recognized by Bohr et al. (J. Pharmacol. 92, 243 (1949)). But this compound has a shortcoming that its toxicity is relatively strong.

The present inventor has studied the production of more effective water-soluble flavonoid derivatives having less toxicity and succeeded in producing several new compounds. Further, the present inventor has studied the methylation of hesperidin for obtaining more effective and less toxic derivatives, and has clarified the chemical structures of the methylated products and their pharmacological properties such as vitamin P-activity and toxicities.

Thus the present inventor has found a new group of compounds which are fundamentally different from the known methylated hesperidin chalcone, and have far weaker toxicity and stronger medicinal effect.

The water-soluble methyl hesperidins included in the present invention belong to a group of compounds representable by the general formula shown below:

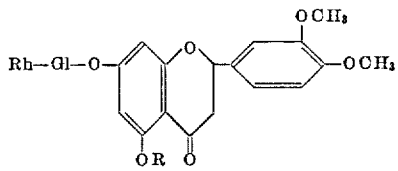

wherein R is hydrogen or methyl radical, Rh is rhamnose or methylrhamnose and Gl is glucose or methylglucose.

In the above general formula, the methylrhamnose and/or methylglucose may have their methyl radical at any position and the number of the methyl radicals is not limited.

Among the water-soluble methylhesperidins of the present invention are counted, for example 3'-methyl-7-(2-methylrhamnosyl - 2 - methylglucosyl) - hesperetin, 3'-methyl - 7 - (rhamnosyl - 2 - methylglucosyl) - hesperetin and 3'-methylhesperidin.

Each of these water-soluble methylhesperidins has stronger vitamin P-activity, less toxicity and higher solubility in water when it is compared with known methylated hesperidin chalcones.

The water-soluble methylhesperidins disclosed above can according to the invention be obtained by methylation of hesperidin. But if hesperidin is methylated with such a methylating agent as dimethyl sulfate in an aqueous solution containing an alkaline agent at about room temperature the product is a mixture of complicated composition including methylated hesperidin chalcone and several kinds of methylated hesperidin.

On the other hand, since the compounds which are excellent in medicinal effect and have low toxicity are methylated hesperidins, it is desired to find a method which produces only methyl derivatives of hesperidin and inhibits the formation of derivatives of hesperidin chalcone as completely as possible. After strenuous studies the present inventor has succeeded in producing water-soluble methylhesperidin as the main product by methylation of hesperidin, reducing the formation of methylated hesperidin chalcone, and in separating the chalcone compound contaminant from the desired compounds.

This invention consists of a method for producing water-soluble methylhesperidin, which comprises methylating hesperidin under the conditions wherein the formation of methylated hesperidin chalcone is inhibited, and then separating effective and low toxic components from the reaction mixture.

The following table shows that water-soluble methylhesperidins have excellent medicinal effects and lower toxicities when they are compared with methylated hesperidin chalcones. In the table, "Medicinal effect" means "prolongation of dye appearance time in the irritated area" in experiments using rabbits as the test animal and Evans blue as the dye. The test is conducted on the basis of the principle reported by A. M. Ambrose and F. DeEds in J. Pharmacol. 90, 359 (1947), and on the basis of the fact that the activity to correct permeability of capillary vessels, one of the vitamin P-effects, can be determined by measuring prolongation ratio of time necessary for leaking dye out of the vessels. The value of the prolongation is expressed in percentage increase of time necessary for initial leakage of dye in the treated group compared with the time of control group. And the toxicities of the compounds are shown as $LD_{50}$ (intravenous) of mice in mg. per kg. of body weight.

| No. | Compound | Medicinal effect (percent) | Toxicity, $LD_{50}$ (mg./kg.) |
| --- | --- | --- | --- |
| 1 | 3'-Methyl-7-(rhamnosyl-2-methylglucosyl)-hesperetin. | 116.7 | 750 |
| 2 | 3'-Methyl-7-(2-methylrhamnosyl-2-methylglucosyl)-hesperetin. | 32.9 | 900 |
| 3 | 3'-Methylhesperidin | 38.6 | 800 |
| 4 | Water-soluble methylhesperidins obtained by the method of this invention—mixture of methylhesperidins including the above three compounds etc. | 95.8 | 850 |
| 5 | 3,6'-Dimethylhesperidin chalcone | 19.8 | 150 |
| 6 | 3,6'-Dimethyl-4'-(rhamnosyl-2-methylglucosyl)-hesperetin chalcone. | 19.4 | 450 |

The detailed physico-chemical properties of the above compounds are itemized in the following.

In the following descriptions, temperatures are all uncorrected and Rf-values were measured by the following method: a sample is subjected to paper-chromatography by ascending method using a solvent-system of ethyl acetate:benzene:ethyl alcohol:water (86:14:2:50) and magnesium acetate-ethyl alcohol reagent is sprayed on the chromatogram, which is then irradiated with ultraviolet ray.

(1) 3'-methylhesperidin:
Colourless needles. M.P. 149–150° C. Rf=0.18.
Molecular formular: $C_{29}H_{36}O_{15}$.
Solubility: Soluble in water. Slightly soluble in methanol, ethanol, acetone and ethyl acetate. Insoluble in ether, petroleum ether, benzene, chloroform and carbon disulfide.

Positive to FeCl$_3$-reaction and HCl-Mg-reaction ethanolic solution).

Ultraviolet absorption of this compound resembles that of hesperidin.

(2) 3'-methyl - 7 - (rhamnosyl - 2 - methylglucosyl)-hesperetin:

Fine colourless needles. M.P. ca. 80° C. R$f$=0.45.

Molecular formula: C$_{30}$H$_{38}$O$_{15}$.

Solubility: Soluble in water, methanol, ethanol, acetone, ethyl acetate and chloroform. Insoluble in ether, petrolium ether, benzene and carbon disulfide.

Positive to FeCl$_3$-reaction and HCl-Mg-reaction.

Ultraviolet absorption spectrum of this compound resembles that of hersperidin.

(3) 3' - methyl-7-(2-methylrhamnosyl-2-methylglucosyl)-hesperetin:

Colourless powdery crystals. M.P. ca. 80° C. R$f$=0.82.

Molecular formula: C$_{31}$H$_{40}$O$_{15}$.

Soluble in hot ether and hot benzene.

Other properties resemble those of the above two compounds.

(4) 3',5-dimethylhesperidin:

Colourless needles. M.P. 145–146° C.

Molecular formula: C$_{30}$H$_{38}$O$_{15}$.

Solubility and other properties resemble those of 3' methylhesperidin above described.

(5) Water soluble methylhesperidins obtained by the method of this invention—a mixture of methylhesperidins including the above four compounds.

Content of methoxyl group (—OCH$_3$): 15:5%.

Solubility: Very readily soluble in water (1:1). Soluble in methanol and ethanol. Slightly soluble in isopropyl alcohol, chloroform and ethyl acetate. Insoluble in ether, benzene and petroleum ether.

FeCl$_3$-reaction: Positive (dark brown).

HCl-Mg-reaction: Positive (yellowish red).

(6) 3,6'-dimethylhesperidin chalcone: R$f$=0.08.

(7) 3,6' - dimethyl-4'-(rhamnosyl-2-methylglucosyl)-hesperetin chalcone: R$f$=0.35.

In this specification, water-soluble methylhesperidin means one of various kinds of methylated derivatives of hesperidin when the term is used in the singular, and means a mixture of two or more of such compounds when it is used in the plural.

In the process of this invention, hesperidin in methylated under such conditions that the formation of methylated hesperidin chalcones is inhibited. In general, flavanone derivatives such as hesperidin are reversibly changed into their chalcone under a strongly alkaline condition as seen in Wilson's U.S. patents supra, for instance. And, when hesperidin is methylated with such a methylating agent as dimethyl sulfate in the presence of an alkaline reagent at a temperature over ca. 30° C., methylated derivatives of hesperidin chalcone are chiefly produced. On the other hand, if the reaction is conducted at nearly room temperature, the reaction gives a mixture of methylated derivatives of both hesperidin and hesperidin chalcone. The present inventor has further found that the methylating temperature required for inhibiting the formation of chalcone compounds is a temperature below room temperature, especially below 10° C. However, when the alkaline agent is calcium hydroxide, the formation of the chalcone derivatives is strongly inhibited. Therefore, in such cases the temperature of the methylation is not necessarily required to be restricted.

The methylation of this invention may be effected by methylating agents such as dimethyl sulfate, methyl halides and diazomethane in the presence of an alkaline agent such as hydroxides or carbonates of alkali or alkaline earth metals. According to the present inventor's finding, the amount of alkaline agent used in the methylation may be not more than 5 moles to 1 mole of hesperidin. Such amount of alkaline agent is enough to inhibit the formation of chalcone derivatives. When the alkaline agent is used in an amount of over 5 moles to 1 mole of hesperidin, methylated hesperidin chalcone is formed as a by-product and when over 10 moles of the alkaline agent is used, methylated hesperidin chalcone is the chief product. On the other hand, the yield of water-soluble methylhesperidins may be lowered when the amount of the alkaline agent is less than 2 moles to 1 mole of hesperidin. However, when the hydroxide of an alkaline earth metal such as calcium hydroxide is used as the alkaline agent, water-soluble methylhesperidin may chiefly be produced even when over 10 moles of the alkali agent is used, in other words in such a case the formation of the chalcone derivatives is well inhibited. However, even when hesperidin chalcone is once formed by alkalinity of the solution, it can be reversed into hesperidin when the pH reaction of the solution is lowered by addition of such a reagent as halide of an alkali earth metal, and the hydroxide of the alkali earth metal is formed in the reaction mixture. Thus the methylation of hesperidin may smoothly be effected as when the reaction is conducted utilizing only hydroxide of the alkali earth metal as the alkaline reagent.

To inhibit the formation of the chalcone derivatives, it is the most preferable that 1 mole of a methylating agent is used to 1 mole of hesperidin. The formation of the chalcone derivatives is increased when more moles of the methylating agent are used.

The methylation in this invention may be carried out in a proper solvent. As the solvent there may be used water or an inert solvent miscible with water such as acetone and dioxane. Use of an organic solvent promotes the reaction, and use of such an organic solvent as ether and benzene may inhibit the decomposition of hesperidin by alkali i.e. the formation of chalcone derivatives.

The above disclosed fact may be illustrated in the undermentioned tables:

RELATIONSHIP BETWEEN THE AMOUNT OF METHYLATING AGENT AND THE COMPOSITION OF THE PRODUCT

[Methylating agent: Dimethyl sulfate]

| Methylating agent (mole) | Water-soluble methylhesperidin (percent)[1] | Methylated hesperidin chalcone (percent)[1] |
| --- | --- | --- |
| 1 | 62.3 | 37.7 |
| 2 | 50.8 | 49.2 |
| 2.2 | 44.4 | 55.6 |
| 4 | 43.9 | 56.1 |
| 5 | 32.5 | 67.5 |

[1] Percent shows relationship between their total methyl groups.

INFLUENCE OF REACTION TEMPERATURE ON THE COMPOSITION OF THE PRODUCT

[Methylating agent: Dimethyl sulfate]

| Temperature (° C.) | Amount of methylating agent to 1 mole of hesperidin (mole) | Water-soluble methylhesperidin (percent)[1] | Methylated hesperidin chalcone (percent)[1] |
| --- | --- | --- | --- |
| 3–5 | 2.2 | 49.2 | 50.8 |
|  | 4 | 62.7 | 37.3 |
|  | 5 | 61.1 | 38.9 |
| 15–20 | 2.2 | 44.4 | 55.6 |
|  | 4 | 43.9 | 56.1 |
|  | 5 | 32.5 | 67.5 |

[1] Percent is as above.

As the reaction mixture is an admixture of various impurities besides several kinds of water-soluble methylhesperidins and a little amount of methylated hesperidin chalcone, they have to be removed from the mixture.

For removing such impurities from the reaction mixture, there may be used such methods as salting out, dialysis, extraction with an organic solvent, absorption, elution from an adsorbent, separation with ion-exchanger and distribution in two solvents. These steps may be conducted solely or jointly and once or repeatedly. For example, an aqueous solution of the product of this invention containing the chalcone derivatives is saturated with a water-soluble inorganic salt such as sodium chloride, whereupon the water-soluble methylhesperidins are separated out almost completely, most of by-products remaining in the aqueous solution.

Or, impurities such as water-soluble inorganic compounds can be removed by dialysis against a water-stream.

On the other hand, an aqueous solution of the impure water-soluble methylhesperidins is shaken with an organic solvent which is not freely miscible with water, such as n-butanol, i-butanol, sec.- or tert.-butanol and methyl ethyl ketone, to leave only impurities in the aqueous layer. In this case, the pH of the aqueous solution may preferably be adjusted to ca. 4–5. Or the aqueous solution is saturated with a water-soluble inorganic salt such as table salt, when the water-soluble methylhesperidins transfer completely into the organic solvent layer. Water-soluble impurities contained in the organic solvent layer may be removed by washing the layer with ca. 15% aqueous solution of table salt.

As the water-soluble methylhesperidins are liable to be adsorbed in various adsorbents, a solution of the water-soluble methylhesperidins may be brought into contact with a proper adsorbent to purify the product. As the adsorbent there may be used, for example, alumina, magnesuim silicate, magnesium oxide, diatomaceous earth, activated charcoal and ion-exchangers. To bring the aqueous solution of the water-soluble methylhesperidin into contact with the adsorbent, there are two kinds of steps: (i) the solution is made to flow through a tower packed with an adsorbent, or (ii) a mixture of the solution and an adsorbent is agitated. Of the two processes, the former is better for industrial purposes because the manipulation is easier than the latter. The water-soluble methylhesperidin thus adsorbed may be eluted with a proper solvent. And the solvent may be selected from those which can readily dissolve the objective compounds, for example, from acetic esters such as ethyl acetate and butyl acetate, alcohols such as methanol, ethanol and butanol, and ketones such as acetone and dioxane. Or a mixture of these solvents containing or not containing water may be employed for the purpose. The elution may smoothly be effected by adding benzene, chloroform, or the like to the solvent. The most preferable solvent for elution is selected experimentally. Thus, impurities such as inorganic salts may be removed.

As was described in the beginning, the product of the present invention is a mixture comprising several kinds of water-soluble methylhesperidins. Therefore, if necessary, the components can be separated from each other, and the separation may be simply effected by adsorption chromatography, for instance.

Chromatography can effect a series of operations such as removing of inorganic impurities, separation of chalcone derivatives and isolation of each component.

For the chromatography, a solution containing one or more of water-soluble methylhesperidins, methylated hesperidin chalcones and organic or inorganic impurities is prepared, and the solvent may be acetone, or acetic esters, for instance. The solution is poured into a column packed with an adsorbent, and the components are developed with a suitable developing solvent, in accordance with the conventional liquid chromatography, to separate them from each other.

When an ion-exchanger is used as the adsorbent, an aqueous solution of the material is passed through a column packed with a cation exchanger, then the objective compounds may be eluted separately from the column with a proper solvent such as diluted ethanol, preferably 30–50% ethanol. The cation exchanger may be a weakly acid from such as methacrylic acid type exchange resin (Amberlite IR–50 (registered trade name of Rohm & Haas Co.), for instance). In this case, the inorganic ions contained in the material is preferably removed in advance by the afore-explained method because the existence of an inorganic ion gives ill-effect to the ion-exchanger.

When the column partition chromatography is conducted utilizing the difference in distribution-coefficient of the components in two solvents, an adsorbent such as silica gel, filter paper powder and starch may be used as the carrier. The development may be conducted according to the conventional method using water saturated with a proper organic solvent as the stationary phase, and a proper organic solvent saturated with water as the mobile phase. Thus the components are developed on the carrier, forming their bands according to their $R_f$-values, and then each component is successively eluted out.

In a similar principle to that of the afore-explained column partition chromatography, the separation of each component may conveniently be conducted by the countercurrent distribution process. Namely, the material is dissolved in a stationary phase similar to the above, and distribution and extraction are continuously conducted between the stationary and mobile phases.

According to the above-mentioned processes, each component is obtained as a solution. From the solution, the solvent is distilled off under reduced pressure at a low temperature to obtain a crude product. Each of the crude components may be purified by recrystallization from a proper solvent such as alcohols, preferably from isopropyl alcohol. Thus each water-soluble methylhesperidin can be obtained separately.

Before the separation of each water-soluble methylhesperidin is conducted by the above method, it is convenient to conduct a preexamination of the kind and content of each component contained in the material by paper partition chromatography. For example, a butanol extract of the reaction mixture is subjected to paper partition chromatography by ascending method using ethyl acetate: benzene:ethanol:water (86:14:2:50), and the chromatogram is sprayed with an alcoholic solution of magnesium acetate and then irradiated with ultra-violet ray. If the sample is obtained by the reaction of 1 mole of hesperidin, 2 moles of sodium hydroxide (10% aqueous solution) and 2 moles of dimethyl sulfate, blue-colour fluorescence can be observed at $R_f$-value of 0.18, 0.45, 0.82, etc., each of which is the spot of a water-soluble methylhesperidin, and the admixed methylated hesperidin chalcones give yellowish spots at $R_f$-value of 0.08, 0.35, etc. under visible rays.

Each component contained in the reaction mixture has the afore-explained chemical structure and medicinal effects. They have vitamin P-like activities in living things, and may be administered orally or by injection for the same purposes as vitamin P. However, a mixture of water-soluble methylhesperidins hardly containing chalcone derivatives also may be used for the same purposes, and the mixture is easier to be used by reason that its production is simple as disclosed above and that its toxicity is less than the known methylated chlacone derivatives and that its solubility in water is high. Medicinal doses of the respective compounds or mixtures of the present invention may be determined in accordance with their amount showing efficacies corresponding to those of vitamin P.

Following examples illustrate and explain the actual working of the present invention, but do not set any limitation of the scope to this invention.

Temperatures given in the examples are all uncorrected.

*Example 1*

To a solution of 6.1 g. of hesperidin (0.01 mol) in 25 cc. of 8% sodium hydroxide solution (0.05 mol) is added dropwise 6.3 g. of dimethyl sulfate (0.05 mol)

with stirring and cooling to below 10° C. After being left standing overnight, the reaction mixture is adusted to pH 5 and filtered, and the filtrate is saturated with sodium chloride, whereupon a resinous substance separates out. The resinous substance is dissolved in 20 cc. of distilled water and salted out again with sodium chloride. The substance is then concentrated to dryness under reduced pressure at a temperature below 60° C. and the residue is dissolved in 30 cc. of isopropyl alcohol. After decolorizing with 1 g. of activated charcoal, the solution is cooled with ice, when a crystalline substance separates out.

The product is washed several times with 20 cc.-portions of ether to obtain yellowish white crystalline powder melting at ca. 95° C. The yield is 4.5 g.

Example 2

To a solution of 6.1 g. of hesperidin in 100 cc. of 50% aqueous dioxane are added dropwise 25 cc. of 8% aqueous solution of sodium hydroxide and 6.3 g. of dimethyl sulfate alternately with stirring and cooling to below 15° C. The mixture is allowed to stand overnight, adjusted to pH 5 and concentrated to dryness under reduced pressure at a low temperature, and the residue is dissolved in 50 cc. of water. The solution is decolorized with 1 g. of activated charcoal and sodium chloride is added, whereupon a resinous substance separates out. The same treatment as in Example 1 of the substance gives yellowish white crystalline powder. The yield is 4.1 g.

Example 3

The filtrate of a reaction mixture obtained as in Example 1 is dialyzed in an oxen intestinal membrane bag against water stream for 15 hours and decolorized with 1 g. of activated charcoal. The solution is then concentrated to dryness under reduced pressure at a low temperature and treated as in Example 1. The yield is 3.8 g.

Example 4

The filtrate of a reaction mixture obtained as in Example 1 is shaken four times with 20 cc.-portions of n-butanol and the combined extracts are washed with 10 cc. of 15% aqueous solution of sodium chloride and dried over 20 g. of calcium chloride. The solution thus obtained is concentrated to dryness under reduced pressure at a low temperature and processed as in Example 1. The yield is 4.2 g.

Example 5

The filtrate of a reaction mixture obtained as in Example 1 is passed through a glass tube (diameter, 7.5 cm.; length, 30 cm.) packed with 100 g. of magnesium silicate and the column is washed with distilled water to remove sodium monomethyl sulfate. Then 200 cc. of 20% methanol is passed through the column to elute the product, and the eluate is decolorized with 1 g. of activated charcoal, filtered, and concentrated to dryness under reduced pressure at a low temperature. Further treatment of the residue is effected as in Example 1. The yield is 4.0 g.

Example 6

To the filtrate of a reaction mixture obtained as in Example 1 is added 50 cc. of isopropyl alcohol, and the mixture is adjusted to pH 6.5–7.0 and filtered. The filtrate is concentrated to dryness under reduced pressure and the residue is dissolved in 200 cc. of distilled water. The solution is passed through two towers successively, one of them being packed with 100 cc. of an anion exchange resin and the other with a cation exchange resin (the flow rate is 0.1, respectively), and the effluent is decolorized with 1 g. of activated charcoal and filtered. The filtrate is concentrated to dryness under reduced pressure at a low temperature and the residue is treated as in Example 1.

Example 7

A solution of 6.1 g. of hesperidin in 200 cc. of methanol is boiled with 15 g. of methyl iodide and 3 g. of potassium carbonate on a water-bath for 3 hours. After cooling the reaction mixture, undesirable inorganic compounds are removed by filtration and the filtrate is concentrated to dryness. Recrystallization from absolute ethanol of the residue gives 4.5 g. of yellowish powder. This powder comprises 3'-methylhesperidin and 3,6'-dimethylhesperidin chalcone.

Example 8

To a suspension of 6.1 g. of hesperidin in 200 cc. of methanol is added an ethereal solution of diazomethane produced from 30 g. of nitrosomethylurea, when the reaction proceeds slowly, evolving $N_2$ gas. After the reaction is continued for 48 hours with shaking, the unreacted hesperidin (3.5 g.) is separated by filtration and the filtrate is concentrated to dryness. Recrystallization from isopropanol of the residue gives 2 g. of pale yellow powder, which contains 3'-methylhesperidin as the main component and small amounts of 3',5-dimethylhesperidin and 3,6'-dimethylhesperidin chalcone.

Example 9

To the milk of lime prepared from 1.8 g. of calcium hydroxide and 50 cc. of water is added 6.1 g. of hesperidin, and then 6.3 g. of dimethylsulfate is added dropwise with stirring. The mixture is yellow at first but gradually becomes clear orange. The reaction is completed after 3 hours and the pH at that time is 7. The same treatment is in Example 1 of the reaction mixture gives 4.5 g. of the product.

Example 10

To the milk of lime prepared from 1.4 g. of calcium oxide and 50 cc. of water is added 6.1 g. of hesperidin and the mixture is treated in the same way as in Example 9.

Example 11

To a solution of 6.1 g. of hesperidin in 25 cc. of 8% sodium hydroxide solution is added a solution of 2.75 of calcium chloride in a little amount of water and the mixture is treated as in Example 9.

Example 12

A suspension of 150 g. of magnesium silicate in 500 cc. of acetone is poured into a glass tube (7.5 cm. in diameter, 30 cm. in length), and after several hours the acetone is drawn off from the bottom of the tube. The column is washed with additional 100 cc. of acetone to prepare a column for chromatography. A clear solution of 5 g. of methylated hesperidin derivatives in 50 cc. of acetone (a little amount of water may be added, if necessary) is poured on the column and the components are developed with a solvent system of ethyl acetate:benzene: ethanol:water (86:14:2:50). The rate of flowing down of the solvent is ca. 0.5–1.0 cc. per minute, and the effluent is collected in fractions of 10 cc. each. The fractions positive to HCl-Mg reaction are grouped according to their Rƒ-value on a paper chromatogram and the fractions having the same Rƒ-value are combined. And each of the combined fractions is concentrated under reduced pressure, whereupon the respective component separates out.

Thus, 3' - methyl - 7 - (2 - methylrhamosyl - 2 - methylglucosyl) - hesperetin, 3' - methyl - 7 - (rhamnosyl - 2-methylglucosyl)-hesperetin and 3'-methylhesperidin are obtained from the 14th to 23rd fractions, the 24th to 40th fractions, and the 90th to 127th fractions, respectively. The respective yields are 150, 600 and 1500 mg. at the lowest in several similar experiments.

The remaining fractions also contain a minute amount of the active components, which can be collected by the same chromatography as above.

Example 13

A glass tube packed with 100 g. of powdered filter paper is washed with a solvent system of ethyl acetate: benzene:ethanol:water (86:14:2:50) and left standing overnight, filled with 200 cc. of the solvent to make the solvent permeate into the column homogeneously. A solution of the crude methylated hesperidin derivatives in a little amount of the same solvent is poured on the column and the components are developed with the same solvent. The effluent is collected in fractions of 10 cc. each and the desired compounds are recovered as in Example 12.

Example 14

A portion of 500 mg. of the crude methylated hesperidins is shaken with a solvent system of ethyl acetate:benzene:ethanol:water (86:14:2:50) for 5 minutes in an instrument for counter-current distribution method having 30 shaking tubes and left standing for 5 minutes. The shaking and standing are repeated alternately to extract the components. And each of the fractions 2nd to 5th, 9th to 18th and 21st to 24th is concentrated under reduced pressure to obtain 3'-methylhesperidin, 3'-methyl-7-(rhamnosyl-2-methylglucosyl)-hesperetin and 3'-methyl - 7 - (2 - methylrhamnosyl - 2 - methylglucosyl) - hesperetin. The respective yields are 100, 100 and 50 mg. at the lowest in several similar experiments.

Example 15

A glass tube (1.5 cm. in diameter, 100 cm. in length) packed with 100 cc. of an anion exchange resin is treated with N-NaOH and N-HCl. A solution of 1 g. of methylated hesperidins is poured on the column at the flow rate of 0.05 to 0.1. The column is washed with 100 cc. of distilled water and the water-soluble methylhesperidins are eluted with 30% methanol fractionally. The effluent is collected in fractions and the desired compounds are recovered separately as in the above example.

Products obtained in each example supra were identified to respective compounds by Rƒ-value on a paper partition chromatogram, analytical values, results of quantitative analysis of methoxyl groups, observation of the colour reactions, etc.

Rhamnosylglucosyl group or the like designated by Rh-Gl- in the before mentioned structural formulae is a radical having the following formula

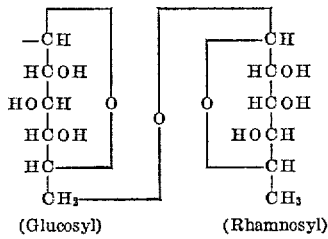

(Glucosyl)    (Rhamnosyl)

or a group in which one or more hydroxyl groups are substituted for by methoxy groups.

What is claimed is:

1. A compound having the formula

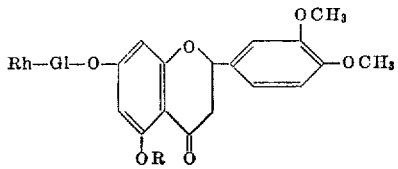

wherein R is hydrogen or methyl, Rh is a member selected from the group consisting of the group consisting of rhamnose and methylrhamnose and Gl is a member selected from the group consisting of glucose and methylglucose.

2. A compound having the formula

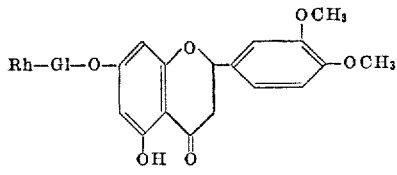

wherein Rh is a member selected from the group consisting of rhamnose and methylrhamnose and Gl is a member selected from the group consisting of glucose and methylglucose.

3. A compound having the formula

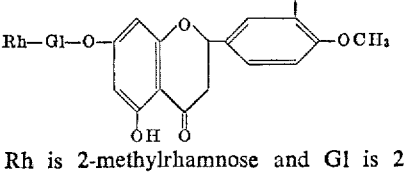

wherein Rh is 2-methylrhamnose and Gl is 2-methylglucose.

4. A compound having the formula

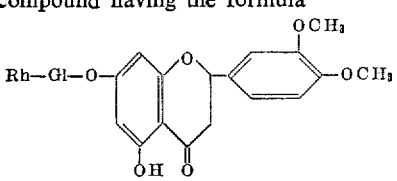

wherein Rh is rhamnose and Gl is 2-methylglucose.

5. A compound having the formula wherein Rh is rhamnose and Gl is glucose.

6. A mixture composed of compounds having the general formula represented in claim 1.

7. A process for producing water-soluble methylhesperidins representable by the formula wherein R is a member selected from the group consisting of hydrogen and methyl, Rh is a member selected from the group consisting of rhamnose and methylrhamnose and Gl is a member selected from the group consisting of glucose and methylglucose, which comprises reacting hesperidin with a methylating agent in an aqueous solution of not more than 5 moles of an alkaline agent to 1 mole of hesperidin at a temperature lower than about 20° C., the concentration of alkaline agent in said aqueous solution being not in excess of about 8%, whereby the formation of methylated hesperidine chalcone is substantially inhibited, said methylating agent being selected from the group consisting of dimethyl sulfate, methyl halide and diazomethane.

8. A process for producing water-soluble methylhesperidins representable by the formula

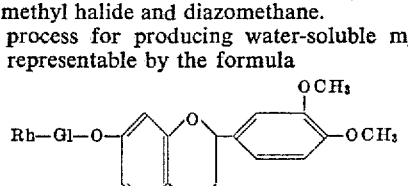

wherein R is a member selected from the group consisting of hydrogen and methyl, Rh is a member selected from the group consisting of rhamnose and methylrhamnose and Gl is a member selected from the group consisting of glucose and methylglucose, which comprises reacting hesperidin with a methylating agent in an aqueous solution of not more than 5 moles of sodium hydroxide to 1 mole of hesperidin at a temperature below 10° C., the concentration of sodium hydroxide in said aqueous solution being not in excess of about 8%, whereby the formation of methylated hesperidin chalcone is substantially inhibited, said methylating agent being selected from the group consisting of dimethyl sulfate, methyl halide and diazomethane.

9. A process for producing water-soluble methylhesperidins representable by the formula

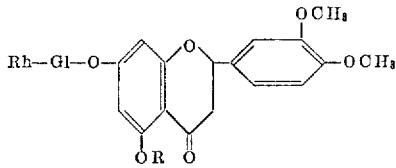

wherein R is a member selected from the group consisting of hydrogen and methyl, Rh is a member selected from the group consisting of rhamnose and methylrhamnose and Gl is a member selected from the group consisting of glucose and methylglucose, which comprises reacting hesperidin with a methylating agent in an aqueous solution of not more than 5 moles of calcium hydroxide to 1 mole of hesperidin, whereby the formation of methylated hesperidin chalcone is substantially inhibited, said methylating agent being selected from the group consisting of dimethyl sulfate, methyl halide and diazomethane.

10. Crystalline 3'-methylhesperidin in the form of colorless needles with a melting point of 149–150° C. and $Rf=0.18$.

11. Crystalline 3' - methyl-7-(rhamnosyl-2-methylglucosyl)-hesperetin in the form of colorless needles with a melting point of ca. 80° C. and $Rf=0.45$.

12. Crystalline 3' - methyl - 7 - (2-methylrhamnosyl-2-glucosyl)-hesperetin in the form of colorless powdery crystals with a melting point of ca. 80° C. and $Rf=0.82$.

13. Crystalline 3',5-dimethylhesperidin in the form of colorless needles with a melting point of 145–146° C.

14. A water-soluble crystalline mixture of 3'-methylhesperidin in the form of colorless needles with a melting point of 149–150° C. and $Rf=0.18$, 3' - methyl - 7- (rhamnosyl-2-methylglucosyl)-hesperetin in the form of colorless needles with a melting point of ca. 80° C. and $Rf=0.45$, 3' - methyl-7-(2-methylrhamnosyl-2-methylglucosyl)-hesperetin in the form of colorless powdery crystals with a melting point of ca. 80° C. and $Rf=0.82$ and 3',5-dimethylhesperidin in the form of colorless needles with a melting point of 145–146° C., said crystalline mixture having a methoxyl content of 15.5%.

References Cited in the file of this patent
UNITED STATES PATENTS 2,425,291 Wilson _____ Aug. 5, 1947
2,615,015 Wilson _____ Oct. 21, 1952

UNITED STATES PATENT OFFICE
CERTIFICATE OF CORRECTION

Patent No. 3,084,154                            April 2, 1963

Ikuo Sakieki

It is hereby certified that error appears in the above numbered patent requiring correction and that the said Letters Patent should read as corrected below.

Column 2, line 68, for "formular" read -- formula --; column 3, line 2, for "ethanolic" read -- (ethanolic --; line 11, for "petrolium" read -- petroleum --; line 15, for "hersperidin" read -- hesperidin --; column 5, line 32, for "nesuim" read -- nesium --; column 7, line 2, for "adusted" read -- adjusted --; column 8, line 32, for "is" read -- as --.

Signed and sealed this 5th day of November 1963.

(SEAL)
Attest:
ERNEST W. SWIDER                                   EDWIN L. REYNOLDS Attesting Officer                                 Acting Commissioner of Patents